United States Patent [19]

Wakabayashi et al.

[11] Patent Number: 4,514,329
[45] Date of Patent: Apr. 30, 1985

[54] PROCESS FOR VITRIFYING LIQUID RADIOACTIVE WASTE

[75] Inventors: Hajimu Wakabayashi, Kawanishi; Ryohei Terai, Ibaraki; Hiroshi Yamanaka, Ikeda; Shigeo Hara, Osaka, all of Japan

[73] Assignee: Agency of Industrial Science & Technology, Tokyo, Japan

[21] Appl. No.: 395,748

[22] Filed: Jul. 6, 1982

[30] Foreign Application Priority Data

Jul. 6, 1981 [JP] Japan ................ 56-106047

[51] Int. Cl.$^3$ .............. G21F 9/16; G21F 9/14
[52] U.S. Cl. ................ 252/629; 252/632; 501/12
[58] Field of Search .......... 252/629, 628; 501/12; 252/632; 264/0.5; 423/326, 328, 329

[56] References Cited

U.S. PATENT DOCUMENTS

| | | | |
|---|---|---|---|
| 3,298,960 | 1/1967 | Pitzer | 252/629 |
| 3,791,808 | 2/1974 | Thomas | 106/52 |
| 3,959,172 | 5/1976 | Brownell et al. | 252/629 |
| 4,221,680 | 9/1980 | Hardwick et al. | 252/626 |
| 4,242,220 | 12/1980 | Sato | 252/628 |
| 4,312,774 | 1/1982 | Macedo et al. | 252/629 |
| 4,333,847 | 6/1982 | Tran et al. | 252/629 |
| 4,376,070 | 3/1983 | Pope et al. | 252/629 |
| 4,377,507 | 3/1983 | Pope et al. | 252/629 |
| 4,382,026 | 5/1983 | Drake et al. | 252/628 |

OTHER PUBLICATIONS

Gayler et al., 1978, The Vitrification of High Level Radioactive Wastes Using Microwave Power, Microwave Power Symposium, Ottawa, Canada, pp. 88-90.

*Primary Examiner*—Leland A. Sebastian
*Assistant Examiner*—Howard J. Locker
*Attorney, Agent, or Firm*—Armstrong, Nikaido, Marmelstein & Kubovcik

[57] ABSTRACT

A process for vitrifying liquid radioactive waste is provided.

In this process, a solution of a water-soluble vitrifying-facilitating inorganic compound in liquid radioactive waste is mixed with a solution obtained by hydrolyzing an alkyl silicate and then the solution mixture is left to gel. Thereafter, the resulting gel is irradiated with microwave to calcine the gel, and the calcined gel is further heated to melt and then cooled to obtain a vitrified product.

3 Claims, 3 Drawing Figures

PROCESS FOR VITRIFYING LIQUID RADIOACTIVE WASTE

BACKGROUND OF THE INVENTION

The present invention relates to a process for vitrifying liquid radioactive waste, and more particularly a process suitable for the solidification of high-level liquid radioactive waste.

Slightly enriched uranium nuclear fuel used in a light water reactor of a nuclear power plant is reprocessed to recover unburned $^{235}$U and formed $^{239}$Pu in a spent fuel.

In this treatment, in general, the spent fuel is dissolved in nitric acid to recover U and Pu by a wet process called the purex process and thereafter remains quite high-level liquid radioactive waste containing at least 99% of fission products (hereinafter referred to as "FP") and a small amount of actinides such as $^{241}$Am and $^{244}$Cm.

The liquid waste has a radioactivity of at least $10^6$ Ci per ton of the uranium fuel and contains at least 1 Ci of radioactive substances per ml of the liquid.

Further, FP and the antinides emit a radiation harmful to human bodies for a period of as long as $10^3$ years and $10^6$ years, respectively. Therefore, they should be isolated from the human life environment during these The liquid waste obtained in the purex process is an approximately 2N nitric acid solution containing, in addition to FP and the actinides, corrosion products formed in the course of the above-mentioned process as well as suspended materials and precipitates. In addition, the solution generates heat, i.e., that of decay of the radioactive elements and, therefore, it is stored in a stainless steel tank having stirring and cooling means.

However, it is quite dangerous to store the liquid for a long period of time as described above. The Atomic Energy Commissionof Japan proposed that the liquid waste should be solidified in a stable form, stored for a while and then isolated from the human life environment for disposal.

Also in other countries having advanced nuclear power technologies, methods of solidifying the liquid waste have been developed. For example, in France, plant for the vitrification of liquid radioactive waste is now operated on an industrial scale.

In Japan, too, investigations have been made on the solidification processes of high-level liquid waste, mainly using borosilicate glass which is a leading solidifying medium in the world and the practical utilization thereof in the near future is expected.

Known solidification processes wherein borosilicate glass is used include (1) a two-step metallic melter process, (2) a two-step ceramic melter process and (3) a one-step ceramic melter method.

The two-step metallic melter process (1) comprises dehydrating, denitrating and calcining high-level liquid radioactive waste in a rotary kiln, or by a spray calcination method or fluidized bed method to form powder, mixing the powder with glass frit, feeding the resulting mixture in a metallic melter, heating the melter by, for example, a high-frequency induction method to melt the glass and cooling the glass for solidification.

The two-step ceramic melter process (2) comprises enriching, denitrating and calcining high-level liquid radioactive waste to obtain powder, mixing the powder with glass frit, feeding the resulting mixture in a glass-melting tank made of ceramic fire brick, heating mixture to a temperature at which electricity can be turned on, inserting electrodes into the molten glass to turn on electricity, melting the glass material by Joule's heat generated and cooling the molten glass for solidification.

The one-step ceramic melter process (3) comprises mixing high-level liquid radioactive waste with glass frit, feeding the resulting mixture in the form of a slurry in a glass-melting tank and then effecting the same treatment as in the above two-step ceramic melter process.

Technical studies are now made on a so-called one-step metallic melter process which comprises mixing high-level liquid radioactive waste with glass frit, feeding the resulting mixture in the form of a slurry in a metallic melter and then effecting the same treatment as in the above two-step metallic melter process, in addition to the above-mentioned liquid waste treatment methods (1) to (3).

However, these processes have many defects. For example, in the two-step metallic melter process (1) and two-step ceramic melter process (2), complicated two steps are necessary for the production and the liquid waste to be treated is generally an approximately 2N nitric acid solution and, therefore, troubles such as blocking of pipes, formation of deposit on the vessel walls, corrosion of the vessel walls or the like caused by the complicated steps occur inevitably in the course of the dehydration, denitration and calcination to obtain the powder.

In the newly developed one-step ceramic melter process and the one-step ceramic melter process (3), ebullition of water abruptly occurs due to the high temperature in the step of melting the glass material in a metallic melter or ceramic melter and, entrained materials such as liquid waste are scattered about in all directions. Furthermore, the metallic melter or ceramic melter is seriously damaged by a great temperature difference.

In all of the above processes, it is required that the vitrified product has an excellent chemical resistance, high homogeneity and freedom from the molybdenum phase separation. To satisfy these requirements, it is necessary to use high-silica glass frit. However, such glass frit has a melting temperature far higher than that having a low silica content. Accordingly, the melting and solidification of the glass in the former case must be effected at a temperature higher than that in the latter case. Consequently, problems are posed in the operation and it becomes inevitable that the metallic melter or ceramic melter is damaged and that the volatilization of ruthenium or cesium is enhanced.

SUMMARY OF THE INVENTION

According to the present invention, all of the above-mentioned defects of the conventional solidification process of liquid radioactive waste can be overcome.

A first object of the present invention is to provide a process for vitrifying liquid radioactive waste rapidly and surely by a simple operation.

A second object of the invention is to provide a highly safe process for vitrifying liquid radioactive waste without causing the scattering or leakage of the liquid radioactive waste or without forming powder during the operation.

A third object of the present invention is to provide a process for vitrifying liquid radioactive waste to form a vitrified product having a high chemical stability.

A fourth object of the invention is to provide a process for vitrifying liquid radioactive waste at a low temperature, which method is substantially free of a possibility of vaporization of dangerous nuclides during the melting operation.

A fifth object of the invention is to provide a process for vitrifying liquid radioactive waste without causing the molybdenum phase separation.

A sixth object of the invention is to provide a process for vitrifying liquid radioactive waste wherein an apparatus used for the treatment of liquid radioactive waste in the prior art can be used as such.

The above-mentioned objects of the present invention can be attained by mixing a solution of a water-soluble vitrifying-facilitating inorganic compound in liquid radioactive waste with a solution of hydrolyzed alkyl silicate, allowing the solution mixture to gel, exposing the resulting gel to a microwave to calcine the same, further heating the resulting calcined product to melt and cooling the same to obtain a vitrified product.

PREFERRED EMBODIMENTS OF THE INVENTION

Figure 1:
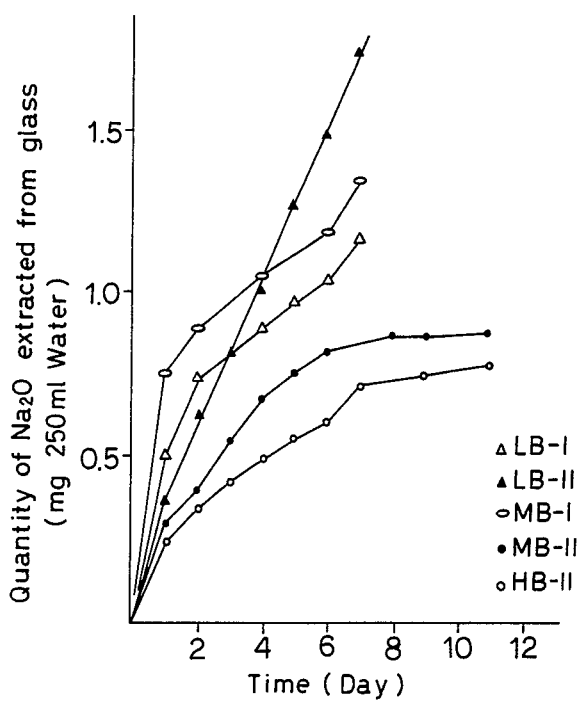
FIG. 1 shows chemical resistances of various glasses obtained by conventional methods of vitrifying liquid radioactive waste.

Liquid radioactive waste to be treated by the method of the present invention is mainly one obtained by the wet reprocessing of spent nuclear fuel according to the purex process to recover unburned $^{235}U$ and formed $^{239}Pu$ but is not necessarily limited to this and any liquid radioactive waste obtained after the reprocessing of spent nuclear fuel with nitric acid can be solidified according to the present invention.

In the method of the present invention, a water-soluble vitrifying-facilitating inorganic compound is added to the liquid radioactive waste to obtain a solution.

As the liquid radioactive waste, there may be mentioned, for example, one obtained in the purex process and nitric acid concentration of the liquid is about 2N.

As the water-soluble vitrifying-facilitating inorganic compound there may be mentioned, for example, boric acid and aluminum hydroxide. If necessary, it may also be selected suitably from the group consisting of lithium nitrate, lithium carbonate, lithium sulfate, magnesium nitrate, magnesium carbonate, magnesium sulfate, calcium nitrate, calcium carbonate, aluminum nitrate, zinc nitrate, zinc sulfate, zirconium oxynitrate and hydrates of them.

In the method of the present invention, a solution (silica sol) is separately prepared by hydrolyzing an alkyl silicate. The alkyl silicate may be selected from known alkyl silicates in a broad range. There may be mentioned, for example, methyl silicate and ethyl silicate. Generally, 1N nitric acid is used for the hydrolysis of the alkyl silicate to form an alcoholic silica sol.

Then, the above-mentioned, solution of a water-soluble vitrifying-facilitating inorganic compound in the liquid radioactive waste and a solution obtained by the hydrolysis of an alkyl silicate are mixed and stirred thoroughly to obtain a homogeneous solution mixture.

If the solution mixture is left to stand at room temperature or heated to a temperature of up to 50° C., the gelation proceeds gradually and is completed within about 30 min to several hours. An excessively high temperature is not preferred, since the gelation is completed in a short time before the solution mixture has been homogenized.

The ratio (based on oxides) of the water-soluble vitrifying-facilitating inorganic compound to the alkly silicate to be added to the liquid radioactive waste is 1 to at least 2, preferably 1 to 2.5–6 (parts by weight).

If the amount of the alkyl silicate is less than 1 part by weight, the molybdenum phase separation occurs easily. Therefore, such a small amount of the alkyl silicate is undesirable.

Then, the gel obtained as above is irradiated with a microwave in the method of the present invention. By this irradiation, the gel is dehydrated, dried and denitrated and further nitrate decomposition and calcination occur to form a calcined batch. In this invention, the calcined batch is further irradiated with the microwave to melt the same or, alternatively, it is molten by an ordinary means such as Joule heating or highfrequency heating means or by heating with an external heat source. The molten product is cooled to obtain a vitrified product.

The wavelength of the microwave is not particularly limited but that of any wavelength corresponding to a commercial frequency admitted at present is usable. The proper irradiation time is about 0.5 to 2 h.

The method of cooling the molten product is also not particularly limited. Generally, it is left to cool naturally.

Advantages of the above-illustrated solidification process of the present invention will be shown below in comparison with the conventional methods.

First, all the starting materials used in the process of the present invention are prepared in a liquid form. As compared with solid (powder or granules), the liquid can be transported more easily, safely and surely in a closed system.

The mixture of the liquid radioactive waste, water-soluble vitrifying-facilitating inorganic compound and silica sol can be homogenized easily by stirring and a chemical reaction proceeds among them quite rapidly and surely by virtue of the characteristics of the liquid.

Therefore, the reaction of the alkyl silicate sol with the radioactive metal element proceeds on a microscopic scale to convert the completely homogeneous sol into a completely homogeneous gel.

This is a first characteristic feature of the present invention. As compared with methods of the preparation of starting materials employed in the prior art, this process attains a more complete homogeneity and has higher simplicity and reliability. The method of the present invention is, therefore, most suitable for the treatment of high-level liquid radioactive waste.

In the conventional two-step processes (the two-step metallic melter process and the two-step ceramic melter process), the solid/solid mixing is effected, namely, the calcined waste (powder) is mixed with the glass frit (mass or granules). In the conventional one-step processes (the one-step metallic melter process and the one-step ceramic melter process), the liquid/solid mixing is effected, namely, the liquid waste is mixed with the glass frit. Thus, it is unavoidable according to these processes that the resulting mixture is physically highly heterogenous.

The glass frit must be molten in another high temperature furnace previously for feeding, thus causing an increase of steps and making the transportation troublesome.

Second, the mixture in the form of sol gradually gels according to the method of the present invention, which enables the dehydration, denitration and calcination to be effected in the gel form. Therefore, troubles such as scattering and leakage of the liquid waste are not caused during the operation. Even in the calcination step, a batch in the form of masses is obtained at a relatively low temperature without the formation of very fine powders, since the reaction on a microscopic scale has already been completed. As a result, there is no fear of the scattering of fine particles. In the conventional two-step processes, inlets or outlets are blocked or deposits are formed on the vessel walls, since the liquid waste per se is directly contacted with the walls heated at a high temperature or contacted with silica particles blown together with flame to effect the dehydration, drying and calcination.

The conventional one-step processes have problems in that the furnace (metallic melter or ceramic melter) is damaged, since the furnace heated at a high temperature is directly contacted with the waste slurry and that the material is scattered due to the rapid boiling of water in the high-temperature furnace.

On the other hand, according to the present invention wherein the mixture (gel) is dehydrated by the microwave irradiation, the dehydration heat source is one generated by the internal heat generation in the water molecules in the gel and, therefore, excess heating is unnecessary. Further, the denitration reaction proceeds owing to the internal heat generation of electric wave-absorbing components (such as Fe, Ni, Co and rare earth elements) contained in the starting material. Therefore, the nitrates of the respective elements contained in the gel are decomposed successively at their decomposition points as the temperature is elevated. Thus, unlike the conventional methods wherein the entire apparatus is always maintained at a high temperature to effect the calcination, the minimum temperature required for the decomposition of the nitrates is determined spontaneously in the method of the present invention and the denitration and calcination can be completed under ideal conditions.

A third characteristic feature of the present invention is that a glass having a given silica content can be molten at a temperature far lower than that employed in the conventional methods. The melting temperature of borosilicate glass generally depends on its silica content. However, the melting temperatures vary depending on the starting materials even if the silica content is constant.

As shown in the following Table 1, a temperature as high as 1200° to 1500° C. is required for melting glasses prepared from ordinary materials. However, when the glasses of the same compositions as above are molten after the calcination of the alkyl silicate gel according to the present invention, the melting temperatures are lowered by about 200° C. The method of the present invention capable of lowering the melting temperature without the reductions of the silica content has the following two advantages: (1) high-silica glass can be obtained and, therefore, chemical durability of the glass can be improved and (2) volatilization of the dangerous nuclides from molten glass considerably decreases, since the glass can be molten at a low temperature.

In melting the waste-containing borosilicate glass by the conventional two-step or one-step metallic melter process, the melting temperature is limited to, at the highest, 1100° to 1150° C. (limit of performance of heat-resistant iron alloy).

TABLE 1

| Glass | LB-I | LB-II | LB-II' | MB-I | MB-II | MB-II' | HB-II | HB-II' |
|---|---|---|---|---|---|---|---|---|
| General melting temp. (°C.) | 1200 | 1200 | 1200 | 1350 | 1350 | 1350 | 1500 | 1500 |
| Melting temp. after the alkyl silicate gel calcination (°C.) | 1000 | 1000 | 1000 | 1150 | 1150 | 1150 | 1300 | 1300 |
| Composition (wt. %) | | | | | | | | |
| $SiO_2$ | 38.1 | 40.8 | 40.0 | 43.1 | 46.0 | 41.5 | 59.3 | 42.6 |
| $B_2O_3$ | 14.3 | 15.3 | 17.7 | 11.2 | 12.0 | 15.5 | 9.3 | 8.3 |
| $Li_2O$ | 5.6 | 5.4 | 3.0 | 2.6 | 2.8 | — | 1.2 | 1.2 |
| $Na_2O$ | 4.5 | 4.8 | — | 2.7 | 2.9 | — | 1.2 | 1.2 |
| MgO | — | — | 3.0 | — | — | 5.0 | — | 7.5 |
| CaO | 4.8 | 5.1 | 3.0 | 2.6 | 2.8 | — | — | — |
| ZrO | — | — | — | — | — | — | — | 2.5 |
| $Al_2O_3$ | 12.0 | 5.3 | 6.1 | 13.6 | 6.1 | 7.0 | 5.3 | 6.7 |
| waste oxides (*) | 21.3 | 23.3 | 27.2 | 23.9 | 27.2 | 31.0 | 23.3 | 30.0 |
| Density (g/cm$^3$) | 2.70 | 2.74 | 2.74 | 2.68 | 2.73 | 2.70 | 2.56 | 2.75 |
| Thermal expansion coefficient ($\times 10^7$/°C.) | 105 | 117 | 91 | 95 | 97 | 77 | 72 | 89 |
| Glass transition temperature (°C.) | 483 | 462 | 492 | 498 | 500 | 566 | 543 | 556 |

Examples of the waste oxides (*) in Table 1 are given in Table 2. The term "waste oxides" refer to oxides formed from the radioactive waste in the course of the calcination and melting.

TABLE 2

| Element | Conc. in liquid waste (mol/l) | Oxide (wt. %) | Chemical formula of starting raw material |
|---|---|---|---|
| Na | 0.97 | 33.68 | $NaNO_3$ |
| Rb | 0.0066 | 0.69 | $RbNO_3$ |
| Cs | 0.034 | 5.31 | $CsNO_3$ |
| Sr | 0.016 | 1.84 | $Sr(NO_3)_2$ |
| Ba | 0.022 | 4.74 | $Ba(NO_3)_2$ |
| Y | 0.0087 | 1.10 | $Y(NO_3)_3 \cdot 6H_2O$ |
| La | 0.016 | 2.89 | $La(NO_3)_3 \cdot 6H_2O$ |
| Ce | 0.030 | 4.79 | $Ce(NO_3)_3 \cdot 6H_2O$ |
| Nd | 0.072 | 13.43 | $Nd(NO_3)_3 \cdot 6H_2O$ |
| Zr | 0.067 | 9.15 | $ZrO(NO_3)_2 \cdot 2H_2O$ |
| Mo | 0.074 | 11.80 | $Na_2MoO_4 \cdot 2H_2O$ |
| Fe | 0.076 | 6.72 | $Fe(NO_3)_3 \cdot 9H_2O$ |
| Co | 0.0060 | 0.50 | $Co(NO_3)_2 \cdot 6H_2O$ |
| Ni | 0.029 | 2.43 | $Ni(NO_3)_2 \cdot 6H_2O$ |
| Te | 0.0076 | 1.34 | $Na_2TeO_4 \cdot 2H_2O$ |

TABLE 2-continued

| Element | Conc. in liquid waste (mol/l) | Oxide (wt. %) | Chemical formula of starting raw material |
|---|---|---|---|
| Cr | 0.0074 | 0.62 | $Cr(NO_3)_3 \cdot 9H_2O$ |

It is impossible to incorporate a large amount of silica with glasses which melt at a temperature below the above-mentioned temperature. Among the glasses shown in Table 1, LB-I, II and II' are considered to be on the border line. As for water resistance of these glasses, it is understood from FIG. 1 [which shows the results of measurement of chemical durability (leaching rate) of glass at 20° C. by continuous leaching method]- that the dissolution of the glass with time can be shown by a substantially straight line. This fact indicates that the glass structure per se is congruently dissolved by the reaction with water. This is undesirable from the viewpoint of safety. Among the curves in FIG. 1, lines MB-II and HB-II indicate that the quantity of $Na_2O$ extracted from glasses is saturated with time in those glasses which contain a large amount of silica and form, by the reaction with water, a protective silica layer on the surface, thus inhibiting the reaction. It is desirable, therefore, from the viewpoint of safety evaluation of the radioactive waste-containing glass to use a glass having as high as possible silica content. However, a high-silica glass has a high melting point and corrodes a vessel or melter wall and accelerates the volatilization of dangerous nuclides. Thus, the development of a high-silica glass having a low melting point has been demanded but one satisfying these requisites could not be obtained in the prior art. It is to be noted, however, that if a batch obtained by the calcination of the gel according to the present invention is molten, a homogeneous quality glass can be obtained at a temperature about 200° C. lower than the melting temperature of ordinary batches as shown in Table 1.

Further, the starting materials are mixed in a liquid state to give a batch in the form of a highly homogeneous gel in the present invention, so that the invention has a characteristic feature that a glass obtained by melting the batch has also quite high homogeneity. The most serious problem in the melting step of the waste-containing glass is the phase separation caused by molybdenum contained unavoidably in FP. One of the causes for the phase separation is heterogeneity of the starting material batch. Namely, a phase calcined in the form of sodium molybdate can be molten quite easily independent of difficultly soluble components such as silica and the former is inclined to have an insufficient compatibility with the latter. This type of molybdenum phase separation is frequently observed in the conventional methods. On the other hand, in case of the gel form batch which has been sufficiently homogenized in the solution, it is considered that the molybdenum phase is hardly separated, since the reaction of molybdenum with silica has substantially been completed. This is another important feature of the present invention.

A fourth characteristic feature of the present invention is that a conventional method can be employed as a part of the method. Namely, in the method of the present invention, an alkyl silicate is allowed to gel, the resulting gel is dehydrated, denitrated and calcined by means of microwave and the calcined batch is further molten by the irradiation with microwave. However, the calcined batch may be fed in an ordinary melter and molten by a conventional method in place of the microwave irradiation.

As a matter of course, the principal characteristic feature of the gelation according to the present invention can be maintained sufficiently in this case. In view of the danger of highly radioactive liquid waste, a method having as high as possible simplicity, easiness and small number of the total steps should be employed. In this respect, an in-can-melting process is the most suitable.

In this process, three materials, i.e., ethyl silicate, high-level liquid waste and a vitrifying-facilitating inorganic compound, are mixed together by thorough stirring in a heat-resistant metallic can. The mixture is allowed to gel in situ and then irradiated with microwave from above to effect the dehydration and denitration by the internal heat generation. The microwave irradiation is further continued to melt the glass. Also in this case, only the glass can be molten substantially without elevating the temperature of the metallic can.

A volume decrease due to the vitrification is made up by adding a supplementary portion of the mixture to the can and repeating the procedure. Then, the can is sealed and, after the decontamination by washing, stored.

The operation of the steps according to this process is simpler and easier than any of other methods. A glass having an extremely high homogeneity can be obtained at a low temperature in spite of its high silica content. All the troubles in the steps of transportation of the material and calcination in the conventional methods can be reduced remarkably and the melter used is not damaged.

The following example will further illustrate the present invention.

EXAMPLE

Figure 2:
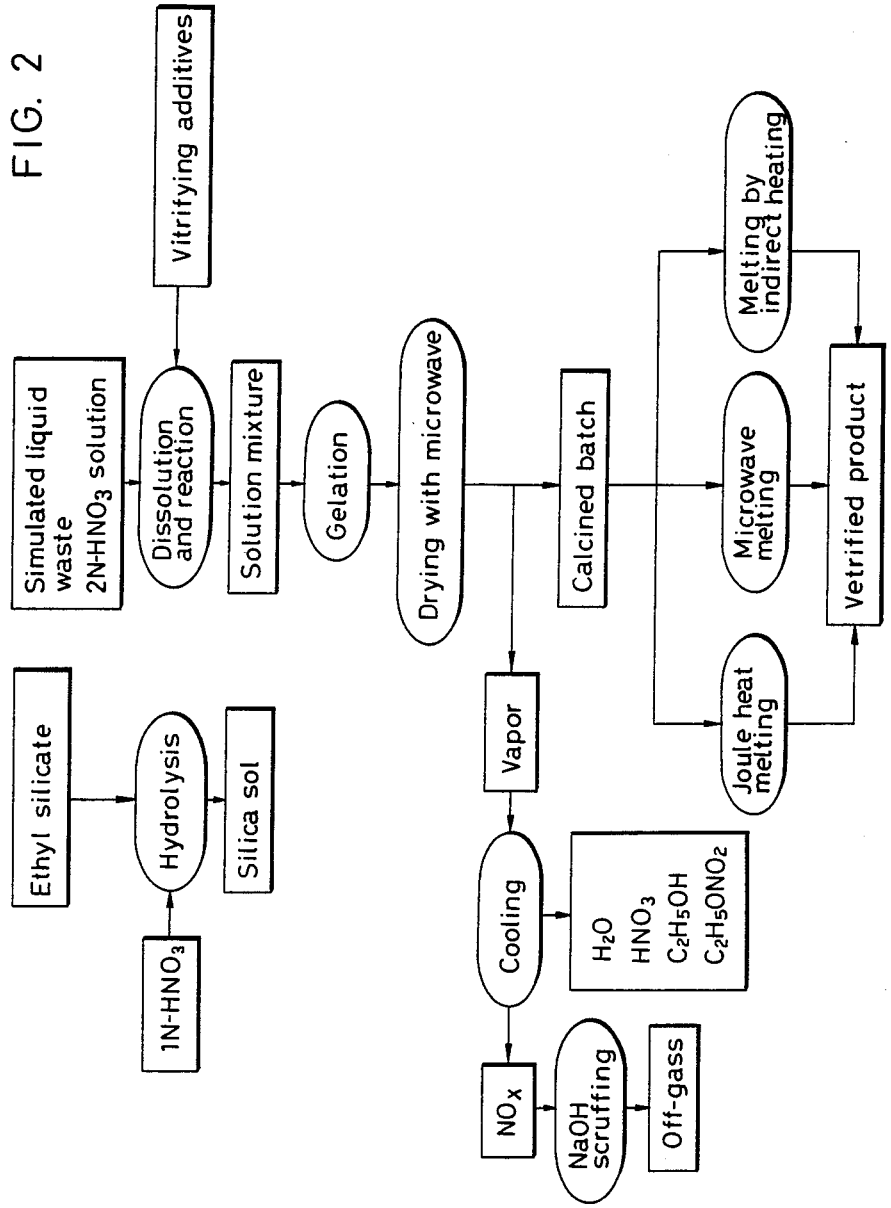
FIG. 2 is a flow sheet showing steps of the process of the present invention.

The vitrification of a simulated liquid radioactive waste was effected according to the flow sheet shown in FIG. 2.

First, a simulated high-level liquid radioactive waste having the composition shown in Table 2 was prepared in the form of a solution in 2N nitric acid.

A vitrifying-facilitating inorganic compound, $H_3BO_3$, $LiNO_3$, $NaNO_3$, $Mg(NO_3)_2$, $Ca(NO_3)_2$, $Al(OH)_3$ or $ZrO(NO_3)_2$, shown in Table 3 was added to the waste to obtain a solution at room temperature.

Three compositions LB-II', MB-II' and HB-II' shown in Table 3 correspond to the same glass compositions, respectively, shown in Table 1.

TABLE 3

| Starting material (per 100 g of vitrified product) | LB-II' | MB-II' | HB-II" |
|---|---|---|---|
| Ethyl silicate ($SiO_2$ content: 40%) | 98.0 g | 102.5 g | 105.2 g |
| $H_3BO_3$ | 31.4 g | 27.5 g | 14.7 g |
| $LiNO_3$ | 13.8 g | — | 5.5 g |
| $NaNO_3$ | — | — | 3.3 g |
| $Mg(NO_3)_2$ | 19.1 g | 31.8 g | 47.2 g |
| $Ca(NO_3)_2$ | 3.9 g | — | — |
| $Al(OH)_3$ | 9.3 g | 10.7 g | 10.3 g |
| $ZrO(NO_3)_2 \cdot 2H_2O$ | — | — | 5.4 |
| HLLW* | 272 ml | 310 ml | 300 ml |

*Simulated high-level liquid radioactive waste

Separately, approximately 1N nitric acid was added to ethyl silicate to effect the hydrolysis, whereby alcoholic silica sol was prepared (volume ratio of ethyl silicate to nitric acid was used 1:0.5).

A solution of a vitrifying-facilitating inorganic compound in high-level liquid radioactive waste and the alcoholic silica gel were mixed and stirred thoroughly at room temperature to obtain a homogeneous solution. The solution was allowed to gel gradually. The time required for the gelation was about 30–40 min.

After completion of the gelation, the gel was heated by the exposure to microwave of 2450 MHz to effect the dehydration and denitration and to remove the alcohol and ethyl nitrate.

The vapor formed when the gel was exposed to the microwave was cooled to remove water, nitric acid, ethyl alcohol and ethyl nitrate. Remaining $NO_x$ was scrubbed with an aqueous sodium hydroxide solution and discharged as an off-gas.

Then, the irradiation was further continued. As the temperature was elevated, the decomposition of the nitrate began. The decomposition was substantially completed after about one hour and a calcined batch was obtained. The calcined batch underwent a considerable degree of sintering and was obtained in the form of masses, though it still contained a small amount of undercomposed gas.

The resulting calcined batch was further heated by the microwave irradiation to melt the same and a vitrified product was obtained by cooling.

Figure 3:
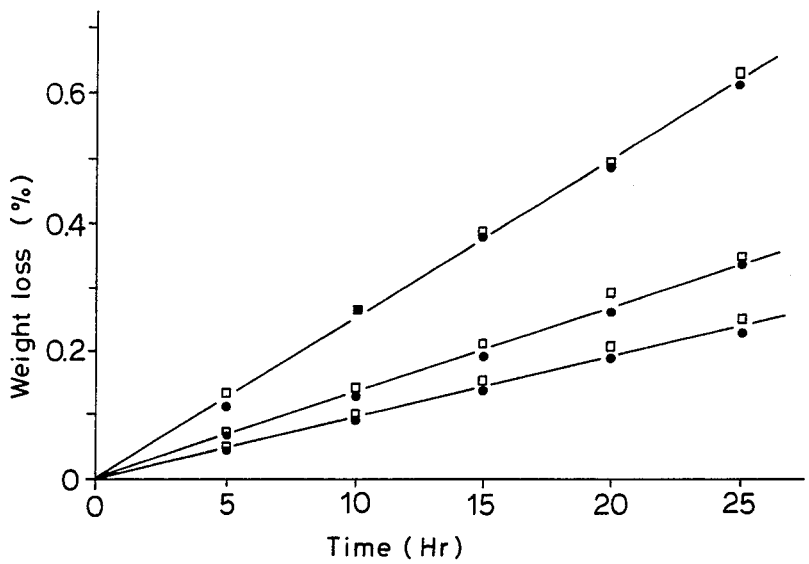
FIG. 3 shows properties of glasses obtained by the method of the present invention and conventional methods.

The vitrified product has an appearance similar to that of a glass molten by an ordinary method, i.e., a glass obtained by pulverizing liquid radioactive waste, mixing the resulting powder with a powdery glass forming material and melting the mixture in an external heating furnace. Leach rates of these glasses in water were measured by means of a Soxhlet's leaching apparatus (94° C.) to obtain results as shown in FIG. 3, and as seen from FIG. 3, values found of the glass obtained by the method of the present invention (shown by black dot marks) are equivalent to those of the glass molten by the ordinary method (shown by square marks), whereby it is evident that the glass according to the invention and that according to the ordinary method have identical glass properties.

What is claimed is:

1. A process for vitrifying liquid radioactive waste, comprising the steps of:

dissolving at least one water-soluble vitrifying-facilitating inorganic compound selected from the group consisting of boric acid, aluminum hydroxide, lithium nitrate, lithium carbonate, lithium sulfate, magnesium nitrate, magnesium carbonate, magnesium sulfate, calcium nitrate, calcium carbonate, barium nitrate, aluminum nitrate, zinc nitrate, zinc sulfate, zirconium oxynitrate and a hydrate thereof, into a liquid radioactive waste acidified with nitric acid adding to the resulting solution an alcoholic silica sol obtainable through hydrolysis with an acid of at least about 1 part by weight of alkyl silicate to 1 part by weight of the at least one inorganic compound, based on the weight of the oxide, and allowing the resulting solution mixture to gel at a temperature of from room temperature to 50? C., calcining the resulting gel by microwave radiation, and heating the resulting calcined product to melt, followed by cooling to obtain a vitrified product.

2. A process for vitrifying liquid radioactive waste according to claim 1, wherein the calcined product is heated by the microwave irradiation.

3. A process for vitrifying liquid radioactive waste according to claim 1, wherein the calcined product is heated by high frequency heating, electric Joule heating or external heating means.

* * * * *